United States Patent
Schäfer et al.

(10) Patent No.: US 9,484,118 B2
(45) Date of Patent: Nov. 1, 2016

(54) BWR NUCLEAR FUEL ASSEMBLY WITH NON-RETAINED PARTIAL LENGTH FUEL RODS

(75) Inventors: Jens Schäfer, Erlangen (DE); Juris Kronenberg, Erlangen (DE)

(73) Assignee: AREVA NP, Courbevoie (FR)

( * ) Notice: Subject to any disclaimer, the term of this patent is extended or adjusted under 35 U.S.C. 154(b) by 910 days.

(21) Appl. No.: 13/499,206

(22) PCT Filed: Sep. 28, 2010

(86) PCT No.: PCT/EP2010/064335
§ 371 (c)(1),
(2), (4) Date: Jun. 7, 2012

(87) PCT Pub. No.: WO2011/039164
PCT Pub. Date: Apr. 7, 2011

(65) Prior Publication Data
US 2012/0243652 A1  Sep. 27, 2012

(30) Foreign Application Priority Data
Oct. 1, 2009 (EP) .................................... 09305934

(51) Int. Cl.
G21C 3/34 (2006.01)
G21C 3/33 (2006.01)
G21C 3/322 (2006.01)
G21C 1/08 (2006.01)
G21C 3/32 (2006.01)

(52) U.S. Cl.
CPC .............. *G21C 3/3305* (2013.01); *G21C 3/322* (2013.01); *G21C 1/084* (2013.01); *G21C 3/3206* (2013.01); *Y02E 30/31* (2013.01); *Y02E 30/38* (2013.01)

(58) Field of Classification Search
CPC ...... G21C 3/326; G21C 3/33; G21C 3/3305; G21C 3/331; G21C 3/344
See application file for complete search history.

(56) References Cited

U.S. PATENT DOCUMENTS

| | | |
|---|---|---|
| 5,229,068 A | 7/1993 | Johansson et al. |
| 5,481,579 A * | 1/1996 | Johansson ............ G21C 3/3305 376/444 |
| 5,553,108 A | 9/1996 | Johansson |
| 2007/0165767 A1 | 7/2007 | Labarriere et al. |

(Continued)

FOREIGN PATENT DOCUMENTS

| | | | |
|---|---|---|---|
| FR | 2910170 A1 * | 6/2008 | .......... G21C 3/3206 |
| JP | H 04-134294 A | 5/1992 | |
| JP | 08-240681 A | 9/1996 | |

(Continued)

OTHER PUBLICATIONS

Notice of Reasons for Rejection Corresponding to Japanese Application No. 2012-531351 dated Jul. 23, 2014.

*Primary Examiner* — Marshall O'Connor
(74) *Attorney, Agent, or Firm* — Davidson, Davidson & Kappel, LLC

(57) ABSTRACT

A nuclear fuel assembly for a boiling water reactor is provided. The nuclear fuel assembly includes a base, a head and a bundle of full length fuel rods and partial length fuel rods. The bundle extends longitudinally between the base and the head, at least one partial length fuel rod having a lower end received in a housing provided in the base and delimited by a closed bottom larger than the lower end. The housing is further delimited by a peripheral wall surrounding the lower end and the partial length fuel rod rests freely on the bottom.

11 Claims, 3 Drawing Sheets

(56) References Cited

U.S. PATENT DOCUMENTS

2008/0101528 A1* 5/2008 Friedrich ............ G21C 3/3305
376/439
2010/0034337 A1* 2/2010 Verdier ................ G21C 3/3206
376/439

FOREIGN PATENT DOCUMENTS

| JP | 2001-174579 | 6/2001 |
| JP | 2007-515651 | 6/2007 |
| WO | WO 2008/087267 | 7/2008 |

* cited by examiner

BWR NUCLEAR FUEL ASSEMBLY WITH NON-RETAINED PARTIAL LENGTH FUEL RODS

The present invention relates to a nuclear fuel assembly for a boiling water reactor comprising a base, a head and a bundle of full length fuel rods and partial length fuel rods, the bundle extending longitudinally between the base and the head, at least one partial length fuel rod having a lower end received in a housing provided in the base and delimited by a closed bottom larger than the lower end.

BACKGROUND

The full length fuel rods (FLFRs in the following specification) are received between the base and the head of the fuel assembly with a small longitudinal gap allowing the FLFRs to expand in their longitudinal direction during operation of the nuclear reactor.

Usually, the upper ends of the FLFRs are attached to the nuclear fuel assembly head.

The partial length fuel rods (PLFRs in the following specification) are used in boiling water reactors (BWR in the following specification) for reasons of thermo-hydraulic stability and neutron moderation.

PLFRs extend upwardly from the fuel assembly base and stop at a distance from the fuel assembly head. Usually, the PLFRs length is comprised between 25% and 75% of the FLFRs length.

The fuel rods are positioned and held longitudinally and transversally by a plurality of spacer grids spaced along the fuel rods. These spacer grids allow for local and limited sliding movement of the fuel rods in the spacer grids to accommodate the fuel rod expansion under irradiation.

Nevertheless, under specific operating conditions, the longitudinal holding force applied by the spacer grids to the bundle of fuel rods may be not sufficient to avoid any longitudinal global displacements of some of the rods.

Accordingly, in order to prevent the PLFRs from lifting-off during the nuclear reactor operation and reaching undesired positions, PLFRs are usually attached to the fuel assembly base.

DE-201 05 913 discloses a fuel assembly where such an attachment is made, for each PLFR, through an elastic bushing welded in a through hole provided in the base of the fuel assembly.

However, such a design requires the welding of additional parts to the nuclear fuel assembly base and is therefore complicated and expensive to manufacture.

US-2008/101528 teaches a simpler and cheaper arrangement. In this arrangement, which corresponds to the preamble of claim 1, the lower ends of the PLFRs are attached to the nuclear fuel assembly base through clips integral with the base and forming the housings. However, such an arrangement still requires specific machining to achieve adequate tolerances for the clips. Therefore, while such an arrangement is satisfactory, it is still desirable to simplify its design and lower its price.

SUMMARY OF THE INVENTION

An object of the invention is therefore to provide a fuel assembly which reduces the risk of lift-off of the PLFRs during operation of the nuclear reactor and which has a simpler design and induce lower costs.

To this end, a nuclear fuel assembly for a boiling water reactor is provided. The nuclear fuel assembly includes a base including at least one housing, each of the at least one housing delimited by a closed bottom and a peripheral wall. The nuclear fuel assembly also include a head and a bundle of full length fuel rods and partial length fuel rods. The bundle extends longitudinally between the base and the head and at least one partial length fuel rod has a lower end received in the housing. The closed bottom is larger than the lower end and the peripheral wall surrounds the lower end. Each of the at least one partial length fuel rod rests freely on one of the at least one closed bottom.

According to specific embodiments, the fuel assembly may include one or several additional features.

BRIEF SUMMARY OF THE DRAWINGS

The invention and its advantages will be better understood upon reading the following description, given solely by way of example and with reference to the appended drawings, in which.

DETAILED DESCRIPTION

Figure 1:
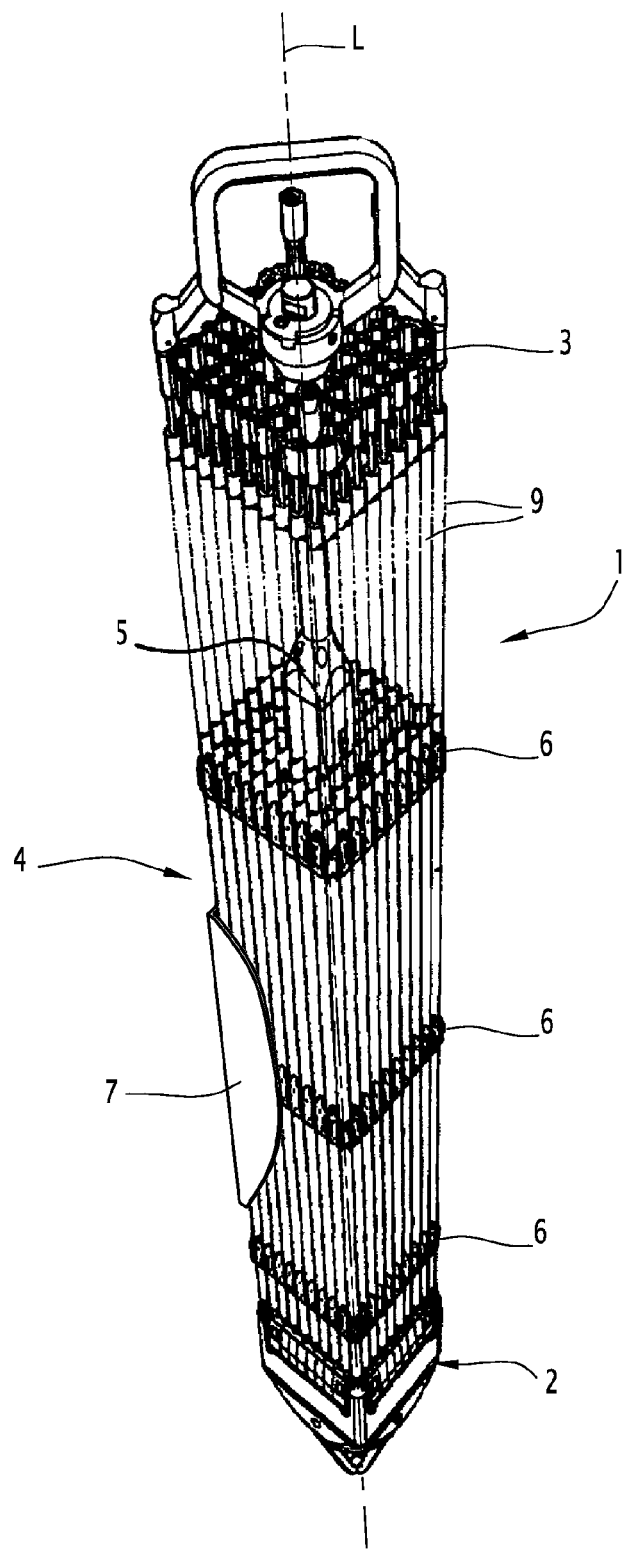
FIG. 1 is a schematic perspective view of a BWR nuclear fuel assembly according to the invention.

FIG. 1 shows a nuclear fuel assembly 1 for a boiling water reactor (BWR). This fuel assembly 1 extends along a vertical longitudinal direction L. Such a fuel assembly 1 is intended to be placed in a core of a nuclear reactor where coolant flows upwardly during operation of the nuclear reactor.

The fuel assembly 1 conventionally comprises:
- a base 2 intended to rest on a lower plate of the core,
- a head 3,
- a bundle 4 of fuel rods, the bundle 4 extending longitudinally between the base 2 and the head 3,
- a water channel 5 placed inside the bundle 4 and connecting the base 2 to the head 3,
- a plurality of spacer grids 6 spaced apart along the longitudinal direction L and maintaining longitudinally and transversally the bundle 4,
- a fuel channel 7 surrounding the bundle 4 and fixed to the base 2 and the head 3.

Only a portion of the fuel channel 7 is shown on FIG. 1.

The bundle 4 comprises full length fuel rods (FLFRs) 9 and partial length fuel rods (PLFRs) 11 not shown on FIG. 1.

Figure 2:
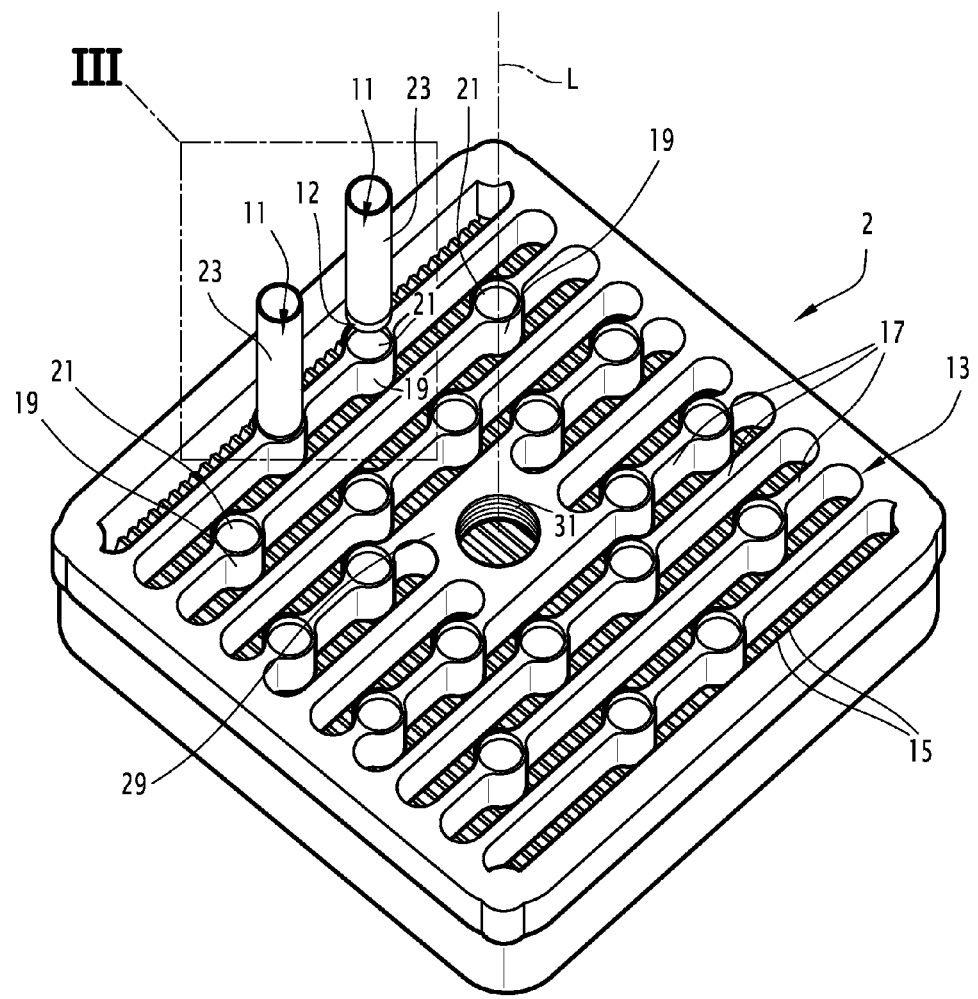
FIG. 2 is a schematic perspective view illustrating the lower debris filter of the nuclear fuel assembly of FIG. 1 and its connection with two PLFRs.
Figure 3:
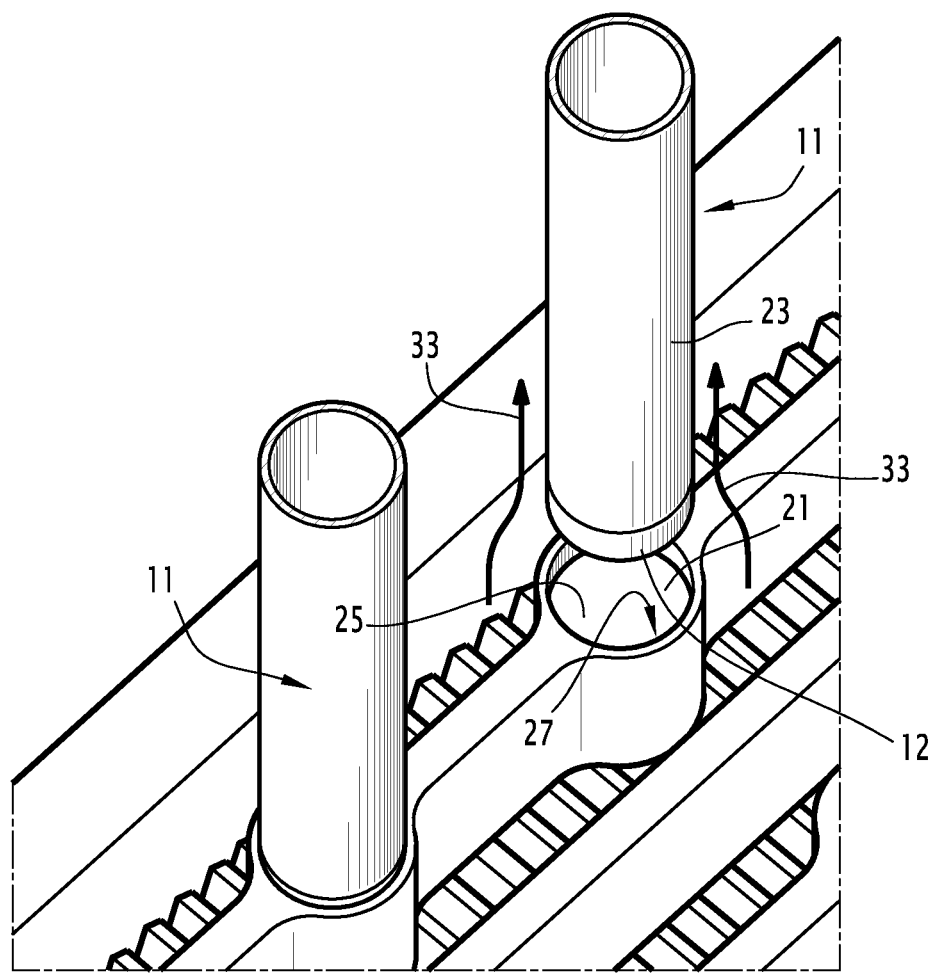
FIG. 3 is an enlarged view of portion III of FIG. 2.

Only two of these PLFRs 11 are partially shown on FIGS. 2 and 3. In the disclosed embodiment, the fuel assembly 1 comprises 20 PLFRs 11 and 92 FLFRs 9. However, these numbers may change from one embodiment to the other.

Each FLFRs 9 and PLFRs 11 comprises a cladding containing nuclear fuel pellets and closed by upper and lower plugs. A lower plug 12 can be seen on FIGS. 2 and 3.

The FLFRs 9 are attached through their upper ends to the head 3 in a conventional way, e.g. by a grid with holes receiving pins provided on the upper plugs of the FLFRs 9.

The FLFRs 9 extend downwardly from the head 3 up to the base 2 while maintaining a longitudinal gap between the lower ends 23 of the FLFRs 9 and the base 2 to allow longitudinal expansion of the FLFRs 9 during operation of the nuclear reactor.

The PLFRs 11 are shorter than the FLFRs 9. They extend upwardly from the base 2 and stop at a distance from the head 3. In some embodiments, the PLFRs 11 within the fuel assembly 1 may have different lengths.

The base 2 includes a debris filter 13 shown on FIGS. 2 and 3. This debris filter 13 has, for example, a first set of parallel transversal bars 15 and a second set of parallel transversal bars 17. The bars 17 are placed above the bars 15 and extend e.g. perpendicular with respect to the bars 15.

The bars 17 have enlargements 19 where housings 21 are provided in the form of upper recesses opening upwardly. Each housing 21 receives the lower end 23 of a respective PLFR 11. The housings 21 have generally similar shapes. Only one housing 21 and its relationship with the respective PLFR 11 is disclosed hereafter with reference to FIG. 3.

The housing 21 is delimited by a closed bottom 25 having substantially a disk shape and a peripheral wall 27 of substantially circular base. The peripheral wall 27 extends upwardly from the bottom 25. The bottom 25 and the peripheral wall 27 are integral with the enlargements. In other embodiments, the housings 21 can be delimited by parts affixed to the debris filter 13.

The diameter of the bottom 25 and of the peripheral wall 27 is slightly greater than the diameter of the lower end 23 of the corresponding PLFR 11. The lower end 23 of the PLFR 11 is received in the housing 21 and rests freely on the bottom 25. This means that the base 2 does not longitudinally retain the PLFR 11 from moving upwardly with respect to the debris filter 13.

On FIG. 3, the right PLFR 11 is shown spaced from the base 2 only to ease the description, but all PLFRs 11 have their lower ends 23 received in their respective housing 21.

The debris filter 13 has a central portion 29 connecting some of the bars 17 and e.g. integral with these bars 17. A through hole 31 is provided in the central portion 29 for receiving the lower end of the water channel 5. The lower end of the water channel 5 is optionally screwed in the through hole 31.

Each housing 21 being delimited by a closed bottom 25 larger than the corresponding PLFR lower end 23 and by a peripheral wall 27 surrounding this lower end 23, the lower end 23 is shielded from the vertical and upward flow of the coolant illustrated by arrows 33 on FIG. 3.

Each lower end 23 is thus protected from the direct flow forces applied by the coolant and that would lead to impact forces resulting from power transients occurring during operation of the nuclear reactor.

Therefore, the longitudinal holding force applied by the spacer grids 6 remains sufficient and the risk of lift-off of the PLFRs 11 is reduced while avoiding specific arrangements for positively retaining the PLFRs 11 against lift-off.

The fuel assembly 1 has therefore a simple design which is cheap to manufacture.

The engagement of the lower ends 23 of the PLFRs 11 in the housings 21 prevents the debris filter 13 from rotating around a central longitudinal axis L with respect to the water channel 5. Therefore, a screw connection can optionally be provided between the water channel 5 and the debris filter 13, as disclosed previously, without the need of an additional anti-rotation feature. This helps further reducing the manufacturing costs of the fuel assembly 1.

Moreover, the lower ends 23 of the PLFRs 11 do not require a specific design and they can therefore be of a similar shape or even have identical lower plugs 12 than the lower ends 23 of the FLFRs 9, thereby reducing further the costs of the fuel assembly 1.

The above mentioned relationship between the base 2 and the PLFRs 11 can be implemented through other parts of the base 2 than a debris filter 13.

Also, only some or even only one of the PLFRs 11 may exhibit such a relationship.

In the disclosed embodiment, the lower ends 23 have a substantially circular base, but other shapes can be contemplated.

The invention claimed is:

1. A nuclear fuel assembly for a boiling water reactor comprising:
    a base, the base including at least one housing, each of the at least one housing delimited by a closed bottom and a peripheral wall, the peripheral wall extending upwardly from the closed bottom;
    a head;
    a bundle of full length fuel rods and partial length fuel rods, the bundle extending longitudinally between the base and the head, at least one partial length fuel rod having a lower end received in one of the at least one housing, the closed bottom being larger than the lower end, the peripheral wall surrounding the lower end, each lower end including a lowermost surface, the entire lowermost surface of each of the at least one partial length fuel rod directly rests freely on one of the at least one closed bottom such that the base does not longitudinally retain the at least one partial length fuel rod from moving upwardly with respect to the base.

2. The nuclear fuel assembly as recited in claim 1 wherein the at least one housing includes a plurality of housings and each partial length fuel rod has a lower end received in one of the housings, each housing being delimited by a closed bottom larger than the respective lower end and a peripheral wall surrounding the respective lower end, each partial length fuel rod resting freely on the bottom of the respective housing.

3. The nuclear fuel assembly as recited in claim 1 wherein the base includes a debris filter, the debris filter including the at least one housing.

4. The nuclear fuel assembly as recited in claim 3 wherein the at least one housing, the at least one closed bottom and the at least one peripheral wall are integral with the debris filter.

5. The nuclear fuel assembly as recited in claim 3 wherein each of the at least one housing is a recess formed in the base and opening upwardly.

6. The nuclear fuel assembly as recited in claim 5 wherein the debris filter has a set of transversal bars, the least one recess being formed in the transversal bars.

7. The nuclear fuel assembly as recited in claim 1 wherein the full length fuel rods and the partial length fuel rods have lower ends of similar shapes.

8. The nuclear fuel assembly as recited in claim 1 wherein the full length fuel rods and the partial length fuel rods have lower plugs that are identical to each other.

9. The nuclear fuel assembly as recited in claim 1 further comprising an internal water channel screwed in the base.

10. The nuclear fuel assembly as recited in claim 1 further comprising a fuel channel fixed to the base and to the head.

11. The nuclear fuel assembly as recited in claim 1 further comprising spacer grids maintaining the full length fuel rods and the partial length fuel rods.

* * * * *